June 17, 1958 C. H. NORDELL 2,839,197
SCREEN
Filed Aug. 20, 1954 5 Sheets-Sheet 1

Inventor:
Carl H. Nordell
By Ahlberg, Nupper & Gradolph
Attorneys

June 17, 1958 C. H. NORDELL 2,839,197
SCREEN
Filed Aug. 20, 1954 5 Sheets-Sheet 2
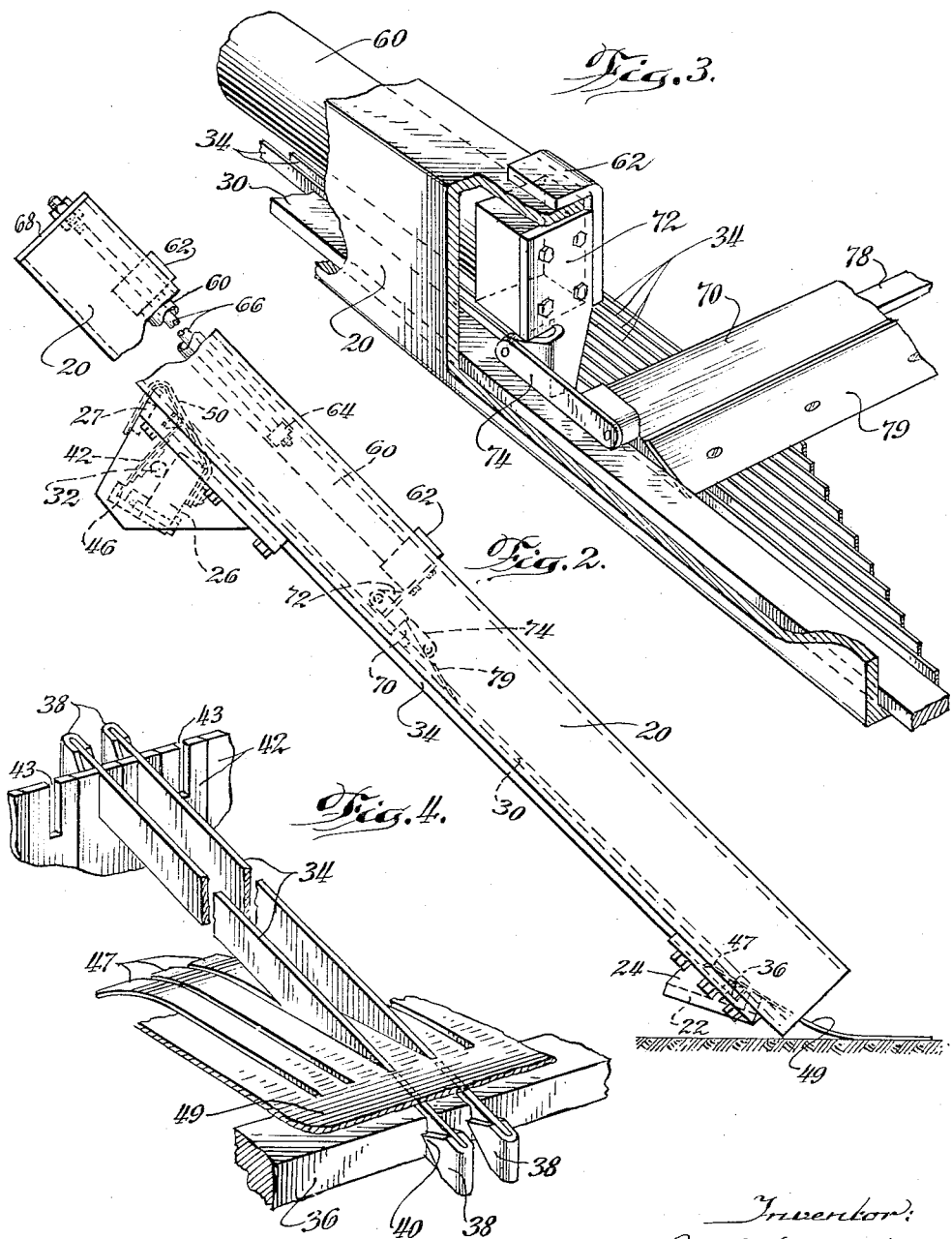

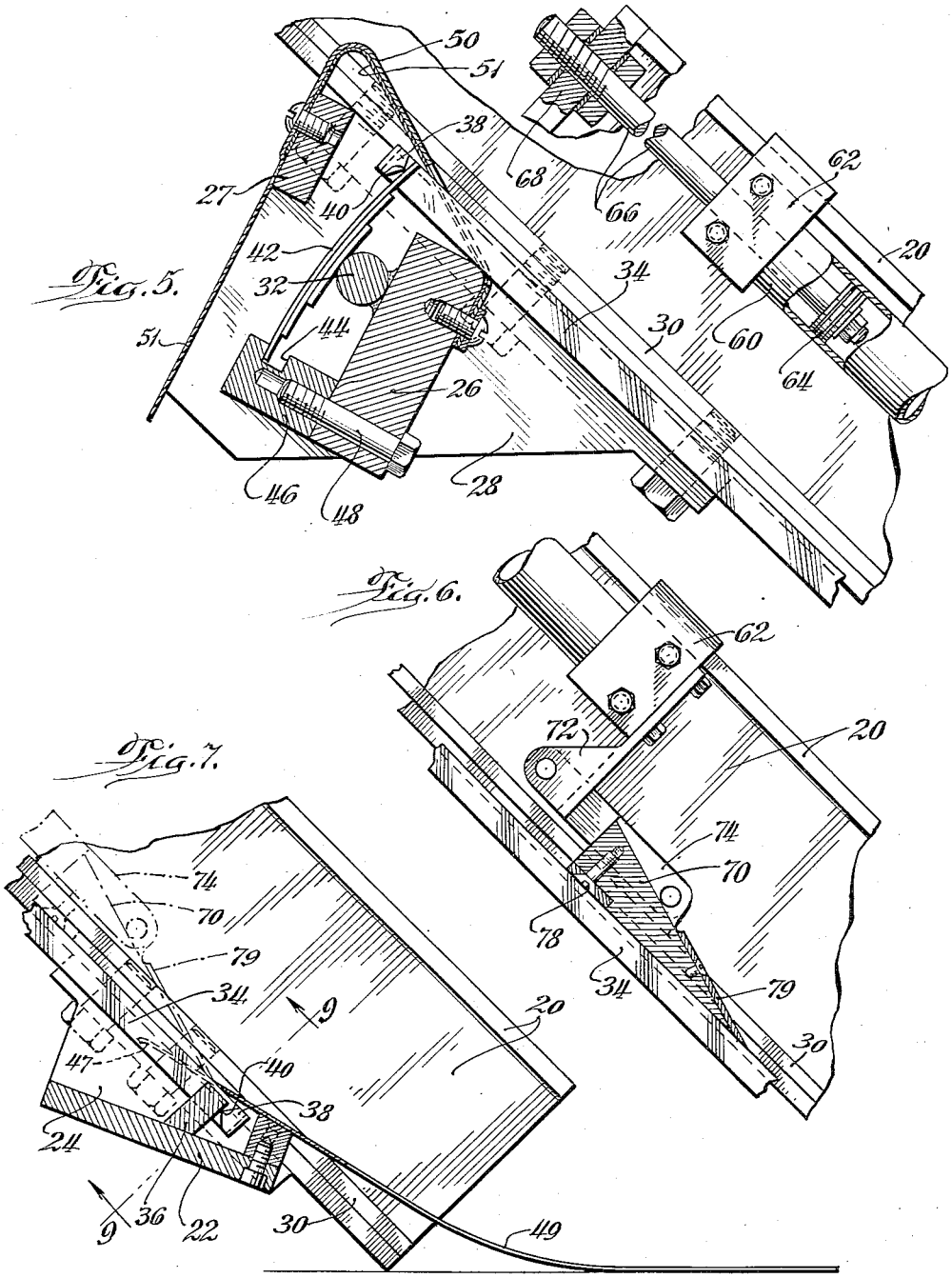

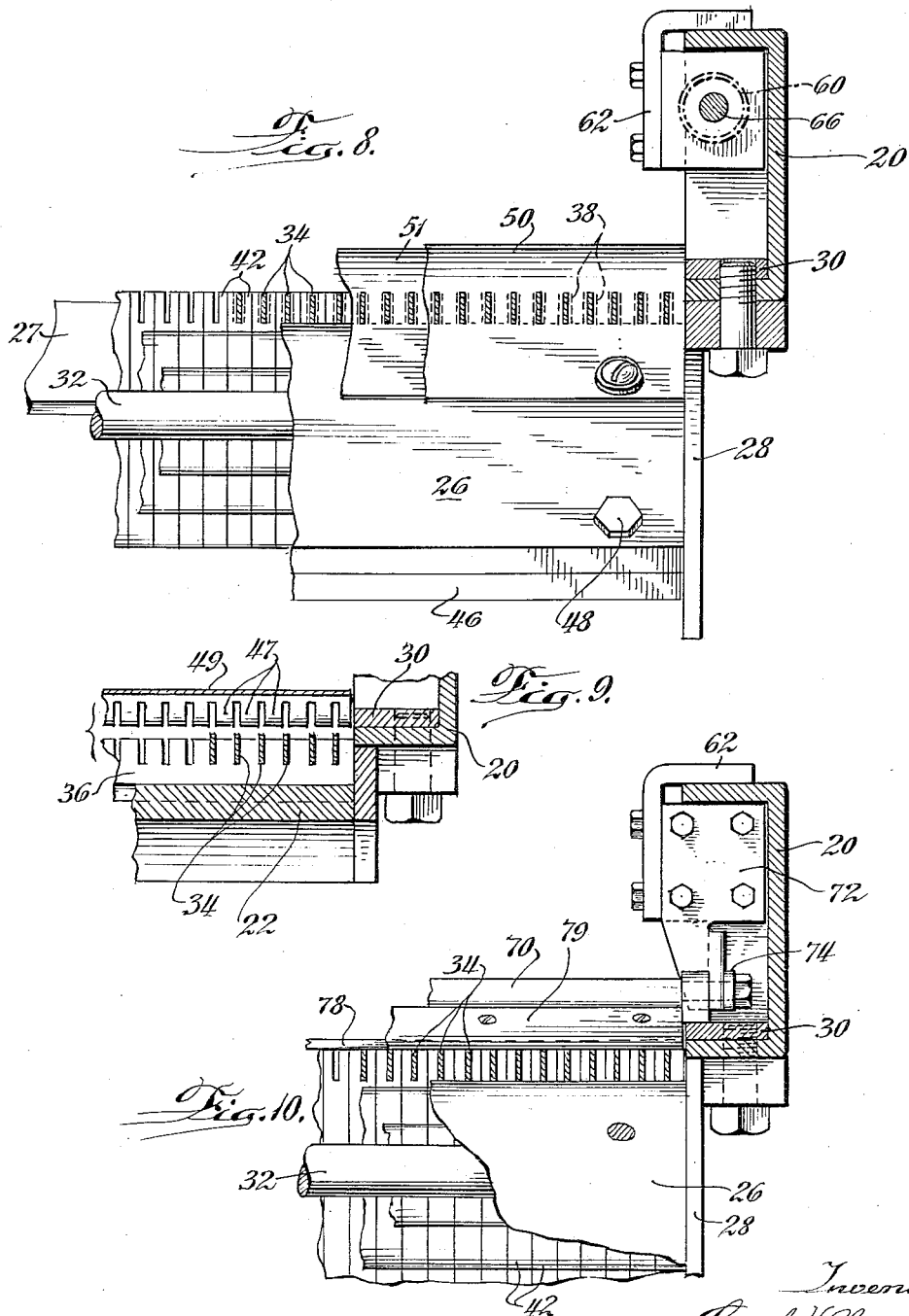

June 17, 1958 C. H. NORDELL 2,839,197
SCREEN
Filed Aug. 20, 1954 5 Sheets-Sheet 5

Inventor:
Carl H. Nordell
By Ahlberg, Wupper & Gradolph
Attorneys

United States Patent Office  2,839,197
Patented June 17, 1958

2,839,197
SCREEN

Carl H. Nordell, Crystal Bay, Nev., assignor of fifteen percent to Louise N. Millspaugh, Long Beach, and fifteen percent to Anne N. Kaspar, Scotia, Calif.

Application August 20, 1954, Serial No. 451,130

18 Claims. (Cl. 210—499)

My invention relates generally to screens, and more particularly to screens for removing solid materials from a flowing liquid, such as screens used at water intakes from flowing or stationary bodies of water.

In addition to being usable at water intakes, the screen is well adapted for use in sewage treatment plants, in industrial processes, and in connection with other apparatus in which it is necessary to remove oversized solids from a liquid.

It is an object of the invention to provide an improved screen employing spaced pretensioned metal ribbons extending across the channel in which the liquid flows.

A further object is to provide an improved screen in which the screening members may be very closely spaced and yet occupy but a small proportion of the cross sectional area of the channel across which the screen is positioned.

A further object is to provide an improved screen having spaced parallel ribbons, which is strong so as to resist damage by heavy floating objects such as logs, blocks of ice, etc.

A further object is to provide an improved screen in which the screen members occupy but a small portion of the total face area of the screen.

A further object is to provide an improved screen which offers a minimum flow resistance.

A further object of the invention is to provide a screen structure which can readily be manufactured in various sizes with various widths of screen openings as, for example, from one-sixteenth inch or less to six inches.

A further object of the invention is to provide a screen which may be cleaned by relatively simple apparatus.

Other objects will become apparent from the following description, reference being had to the accompanying drawings, in which:

Fig. 2 is a side elevation of the screen, showing it installed in the channel at an angle to the vertical;

Fig. 3 is a fragmentary sectional view illustrating the means by which the screen may be cleaned;

Fig. 4 is a fragmentary sectional perspective view showing the manner in which the ends of the ribbons forming the screen are secured;

Fig. 5 is a fragmentary sectional view, taken on the line 5—5 of Fig. 1;

Fig. 6 is a fragmentary sectional view showing how the wiping and cleaning rake may cooperate with the screen;

Fig. 7 is a fragmentary sectional view showing the lower end of the screen and the apron engaging the lower end of the channel and preventing flow beneath the screen structure;

Fig. 8 is a fragmentary sectional view, taken on the line 8—8 of Fig. 1;

Fig. 9 is a fragmentary sectional view, taken on the line 9—9 of Fig. 1, showing the apron detached;

Fig. 10 is a fragmentary sectional view, taken on the line 10—10 of Fig. 1;

This is a continuation-in-part of my copending application Serial No. 278,822, filed March 27, 1952, now abandoned, which in turn is a division of my copending application Serial No. 261,973, filed December 17, 1951, which issued as Patent No. 2,750,044 on June 12, 1956.

Figure 1:
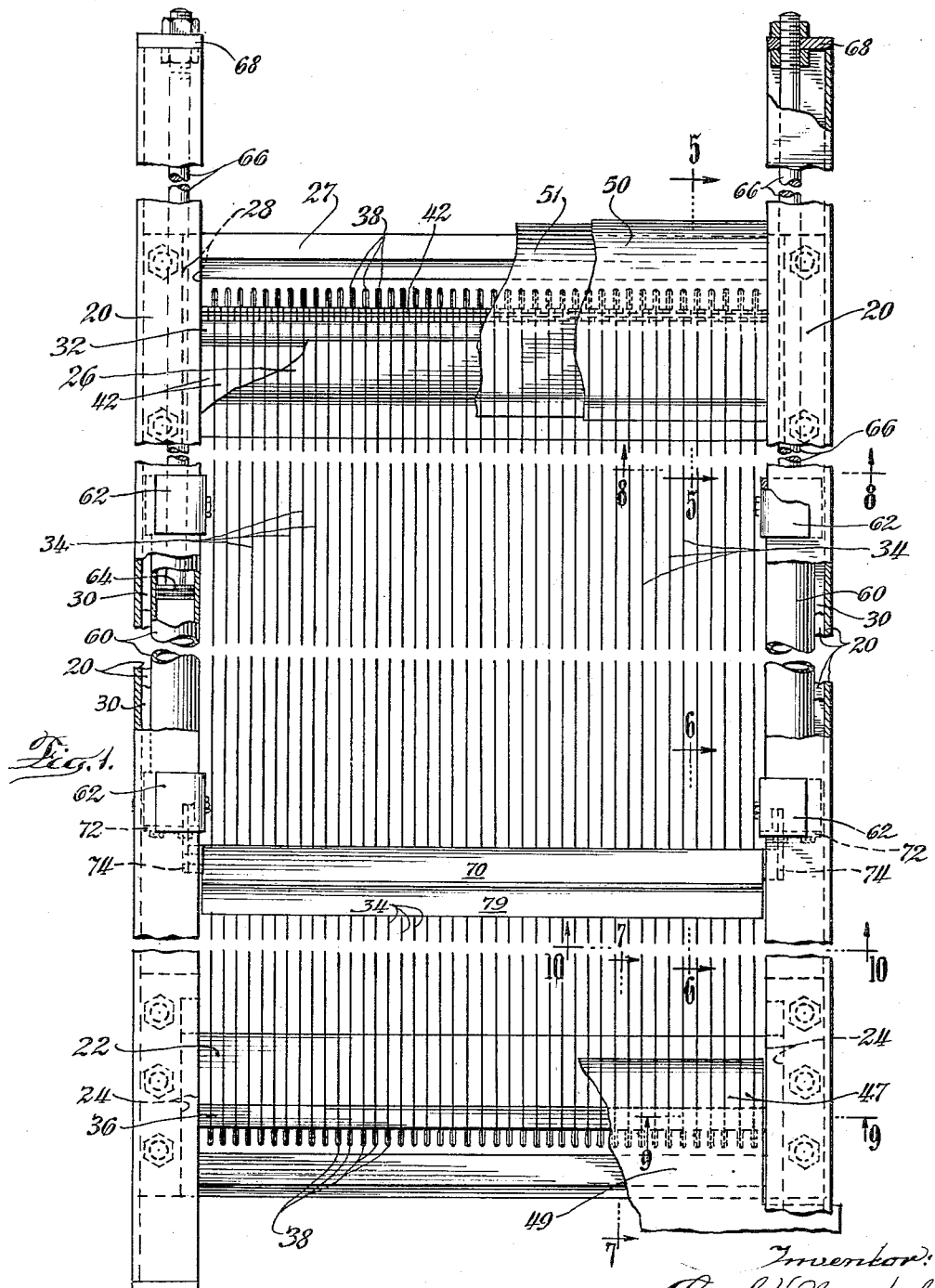
Fig. 1 is an elevation of the screen (assuming it is installed in the channel in a vertical position), parts thereof being broken away more clearly to show the structure.

The invention is illustrated in Figs. 1 to 10 as comprising a frame formed by a pair of side channels 20. These channels are joined by a cross plate 22 having brackets 24 at its ends, which are bolted to the channel. At the upper end of the screen there are cross bars 26 and 27 which have brackets 28 welded to their ends, the brackets being bolted to the channels 20. Each of the channels may be provided with a reinforcing bar 30 (Fig. 5). The cross bar 26 has a fulcrum rod 32 welded thereto.

The screening members consist of thin ribbons 34 preferably made of stainless steel. The lower ends of the ribbons 34 are anchored in a slotted anchor bar 36 as best shown in Figs. 4, 7, 9, and 10. Each ribbon has an anchor cap 38 at each end thereof. This is a U-shaped piece of sheet metal formed to fit around the end of the ribbon and welded thereto. These caps have points 40 on their sides so that the contact with the supporting members is centrally located with respect to the width of the ribbon in order to distribute the stresses uniformly across the width of the ribbon. The upper end of each of the ribbons 34 has its cap 38 engaged by a three leaf spring 42, the upper end of the longest leaf of this spring being slotted to receive the ribbon. The springs 42 bear at their centers against the fulcrum rod 32. The lower ends of the leaf springs 42 bear against the wall of a groove 44 in a bar 46 which is secured to the cross bar 26 by a number of studs 48.

As best shown in Fig. 8, the leaf springs 42 are of substantially the same width as the center to center spacing of the ribbons. The leaves of each spring 42 may be spot welded together at their centers.

The tension applied to each of the ribbons 34 by its leaf spring 42 is substantial, being sufficient to stress the ribbon to one-half the allowable stress in tension. A sheet metal apron 49 is suitably secured to the lower cross plate 22 and flexes against the bottom of the channel to prevent flow beneath the screen. As best shown in Fig. 4, the upper edge of the apron 49 is slotted to provide fingers 47 extending into the spaces between the ribbons 34.

The leaf springs and the upper ends of the ribbons are covered by shield plates 50 and 51 which are slotted to receive the ribbons 34.

Flat metal ribbons are much to be preferred over wires which have heretofore been used in screens usually designed to screen sand and like solid materials.

The advantages of the flat ribbons are many. When it is desired to have narrow slots between the ribbons, the thickness of the ribbon becomes of great importance, for if the ribbon has to be as thick as the slot, only fifty percent of the gross area of the screen will be left for the flow of the water. Flat ribbons, as distinguished from wires, are very much thinner for the same cross sectional area of metal.

For example, a screen made of ribbons only .02" thick and ½" wide having a span of thirty inches was found to be very practical. To get an equal cross sectional area in a wire would require one of nearly one-eighth inch in diameter. In this exemplary screen, the clear width of the slots was only .25", so that if it had been made of wire about one-third of the gross area of the screen would have been occupied by wire, whereas less than one-twelfth of the gross area of the ribbon screen was occupied by the ribbons.

Of probably equal or greater importance is that the material of which the screen members are made is much more advantageously disposed for strength in the ribbon than it is in the wire. The wire can resist a load imposed upon it only by stretching into a catenary curve, whereas the ribbon has the structural characteristics of a beam. The beam is one in which the neutral axis lies at the top edge of the ribbon where the load is to be imposed, and the ribbon may be calculated for the load so that the lower edge of the ribbon is subjected to the maximum working fiber stress. It is then necessary only that the springs be so tensioned that the tension imparted to the ribbon, considered over the entire cross section of the ribbon, is one-half the allowable unit stress in the outermost lower fiber. When the load is imposed, the disposition of the stress is just the same as that below the neutral axis of an ordinary beam, and the shear which is ordinarily carried by the compression part of the beam is replaced by the force of the spring.

Thus, very high strength is secured with the use of very thin material. It is to be understood that the ribbons are so proportioned that the most extreme load to be encountered will not introduce compressive stress into the upper edge of the ribbon, as it would buckle, and of course the maximum fiber stress should be the working stress allowed for the material used.

Aside from this great advantage of strength, the ribbons are the only practical means of making a screen with tension members for use in removing solids from water. If round wires were to be employed, the screen would frequently permit passage of solids considerably larger than the clear spacing of the wires, because the lodgment of any debris on a portion of the screen imposes a load upon that particular portion, and round wires would deflect so that there would be sidewise openings between the deflected wires and the adjacent wires, and depending upon conditions, such sidewise openings might be many times larger than the normal openings between the wires.

It is important that the ribbons be tensioned from the center of their ends, that is, the tensioning forces should be applied at points adjacent the longitudinal center line of the ribbon. The purpose of that is to distribute tensional forces uniformly across the cross section of the ribbon. This may be done by securing the ribbons by a hook through a hole in the center, but is preferably accomplished by means of the caps 38 welded to the ends of the ribbon, having bearing edges 40 in the plane of the longitudinal center line of the ribbon. If the tensioning forces are not applied to the ribbon at points adjacent the longitudinal center line of the ribbon, the ribbon will have a tendency to twist or warp, thus altering the spacing between ribbons.

The upper end of each of the springs 42 is provided with a slot 43 just wide enough to receive the ribbon. They bear at their centers upon the fulcrum rod 32 and their lower ends are secured in the groove 44 of the bar 46. The method of assembly is to insert the ribbon into the slot of the spring, the ribbon being positioned by slots in the shield plates 50 and 51 attached to the cross bars 26 and 27. The tension is obtained by proportioning the cross bars 26 and 46 so that the spring is brought to the required degree of tension when its lower end is pressed into the groove 44 in the bar 46. This is a convenient method of tensioning the ribbons when they are very close together, as by this means they can be made with separations as small as one-sixteenth of an inch.

This method of tensioning the ribbons permits very much closer spacing than would be possible if coil springs were used, for the tension applied to each ribbon is usually fairly high, such as 50 to 100 pounds, and it is difficult to get coil springs capable of applying a force of this magnitude and having a sufficiently small diameter to permit the close spacing.

The purpose of tensioning each ribbon individually is so that the elastic deformation of the cross bars and the manufacturing deviations from exact lengths will not seriously affect the tension of the springs, and hence the load sustaining capability of the screen surface will not be affected. When the ribbons are spaced far enough apart so that each can be secured by a nut and a hook, each spring may be brought up to the exact degree of tension required. For all commercial purposes it is sufficient that these spring tensions approximate one another within the commercial tolerances allowed, and it is obvious that compensation may be made for the overall elastic deformation of the cross bars 22, 26, 36, and 46, swelling them in the center so that in the completed screen the ribbons near the center will be tensioned equally with the ones at the sides.

The strength of the screen surface is frequently of considerable importance in screens for removing solids from water. There is always to be envisioned a power failure which would leave the screen unclean for perhaps a considerable time, with the result that the solids would cover it so as to prevent the passage of water, and it would then act as a dam. Depending upon conditions, as much as five feet of water pressure may be imposed upon the upstream surface of the screen.

As previously stated, this form of screen has advantages in that it may be cleaned by the use of relatively simple apparatus. One form of such screen cleaning apparatus is shown in the drawings as comprising a pair of hydraulic reciprocating motors having cylinders 60 which are secured to brackets 62 conformed to engage and slide upon the upper flanges of channels 20. Pistons 64 (Fig. 5) in the cylinders 60 have their rods 66 secured to cross plates 68 which are in turn secured to the channels 20. Any well known electric-hydraulic means may be employed to control the motors.

A wiping rake 70 rests upon the upstream edges of the ribbons 34 and is pivotally secured to brackets 72 bolted to the lower ends of the cylinders 60 by links 74. This link connection is employed so that the rake 70 may slide up over the shields 50, 51 as the rake reaches the upper end of its stroke, and thus push debris beyond the shield 50. The shield 50 is preferably made of an abrasive-resistant plastic, while the shield 51 is made of sheet metal. The rake 70 is provided with wear strips 78 and 79 (Fig. 6) for engagement with the upstream edges of the ribbons 34 to wipe debris therefrom and push it upwardly past the shield 50. The wear strips may be provided with tines projecting into the spaces between the ribbons and may be made of an abrasive-resistant plastic.

The method and means for cleaning the screen is not claimed herein but is disclosed and claimed in my co-pending application Serial No. 424,014, filed April 19, 1954.

Figure 11:
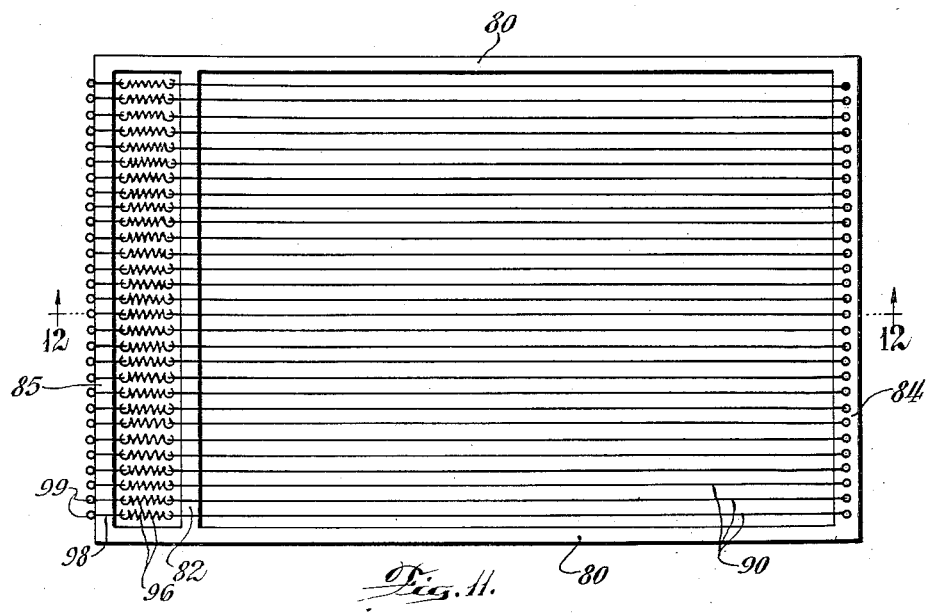
Fig. 11 is an elevational view of a modified form of the invention.
Figure 12:
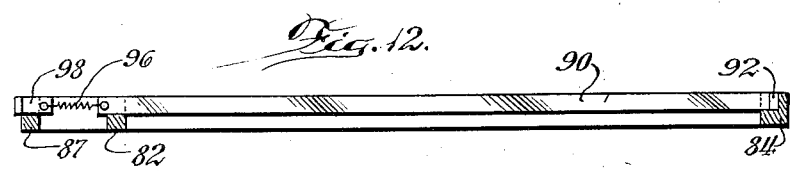
Fig. 12 is a sectional view thereof, taken on the line 12—12 of Fig. 11.
Figure 13:
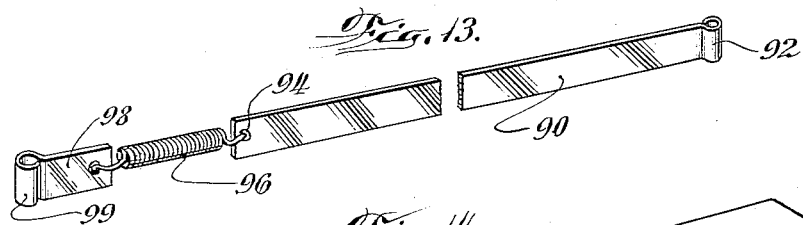
Fig. 13 is a perspective view of one of the screening members.
Figure 14:
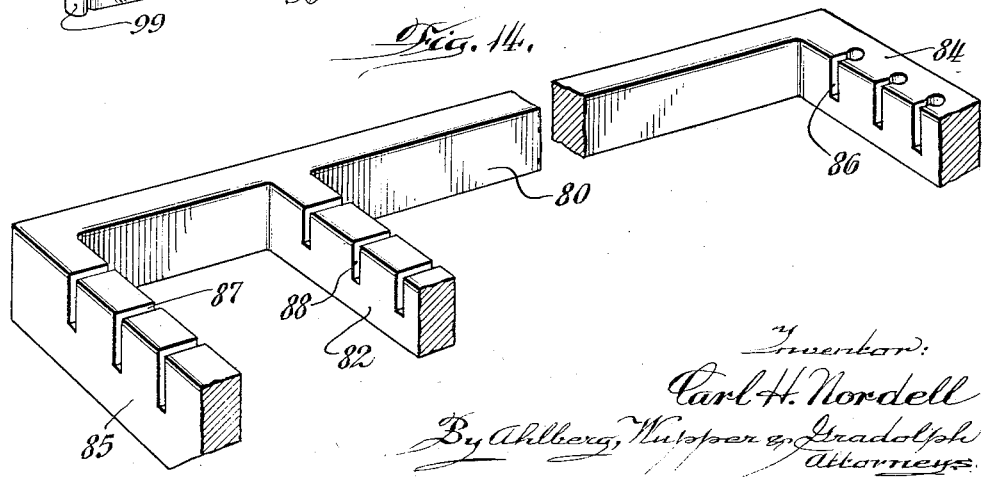
Fig. 14 is a perspective view of the frame for supporting the screening members.

If the screen is of small size, it is not expected to be subjected to extremely heavy loads, and if close spacing of the ribbons is not a requirement, the screen may be constructed in the manner shown in Figs. 11 to 14. In this modified form of the invention the screen is illustrated as having a cast metal frame 80 of generally rectangular shape and including a cross bar 82 near one end thereof. The end 84 of the frame is provided with closed end slots 86, keyhole shaped in cross section. The other end 85 of the frame, and the cross bar 82, are provided with slots 87 and 88 respectively, which are in alignment with the slots 86.

Each of the ribbons 90 has one end 92 curled to form an anchor which fits in the portion of the slot 86 which is of circular cross section. The other end of the ribbon is provided with a hole 94 for the reception of the end of a tension spring 96, the other end of the spring being similarly secured to a keeper 98 having a curl 99 which abuts the end 85 of the frame.

As in the previously described form of the invention, in the embodiment of Figs. 11 to 14 each of the ribbons is maintained under tension by means of a spring which applies the tensioning force at the longitudinal center line of the ribbon so that the stresses within the ribbon are substantially uniform across its width. However, some lack of uniformity may result due to misalignment of the circular portions of the slots 86 and the curled end 92 of the ribbon, and the screen of the latter construction is therefore less well adapted for heavy duty use than the form of the invention shown in Figs. 1 to 10. In both forms of the invention individual ribbons which may have become damaged may be replaced without disturbing the remaining ribbons.

In the following claims the words "upper" and "lower" are used in a relative rather than absolute sense, because in many cases the screens may be installed with the ribbons extending horizontally.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A screen for separating undesired solids from a flowing liquid stream comprising, a generally rectangular frame including two side members and upper and lower cross members, which together with the side members define the outlines of the space through which the liquid may flow; a plurality of spaced parallel flat metallic ribbons secured to the lower cross member against upward longitudinal movement, means carried by the upper cross member to apply longitudinal tension individually to each of the ribbons, said means comprising leaf springs, means connecting the springs respectively to the upper ends of the ribbons conformed to apply the resilient forces of the spring at points adjacent the longitudinal center lines of the ribbons, and means to hold the leaf springs flexed to cause them continuously to apply substantial tension to the ribbons.

2. A screen for separating undesired solids from a flowing liquid stream comprising, a generally rectangular frame including two side frame members and at least two cross members which together with the side frame members define the space through which the liquid may flow, a plurality of spaced slots in one of the cross members, the slots being in the top of the cross member and extending in a direction parallel to the side members of the frame, a plurality of thin metal ribbons each having one end thereof extending through a slot in the cross member and having means at its extremity to prevent longitudinal movement in one direction, a plurality of leaf springs, one for each ribbon, mounted adjacent one another on the other frame cross member, one end of each of the leaf springs being slotted to engage a ribbon, and means to hold the leaf springs in a flexed position such that a substantial tensional force is individually and continuously applied to each of the ribbons.

3. A screen for separating undesired solids from a flowing liquid stream comprising, a generally rectangular frame including two side frame members and upper and lower cross members which together with the side frame members define the space through which the liquid may flow, a plurality of spaced slots in the lower cross member, the slots being in the top of the cross member and extending in a direction parallel to the side members of the frame, a plurality of thin flat metal ribbons each having the lower end thereof extending through a slot in the lower cross member and having means at its extremity to prevent upward longitudinal movement, a plurality of leaf springs mounted adjacent one another on the upper frame cross member and operatively engaging the upper ends of the ribbons respectively, and means to hold the leaf springs in a flexed position such that a substantial tensional force is continuously applied to each of the ribbons.

4. A screen for separating undesired solids from a flowing liquid stream comprising, a generally rectangular frame including two side members and upper and lower cross members, which together with the side members define the outlines of the space through which the liquid may flow, a plurality of spaced parallel flat metallic ribbons secured to the lower cross member against upward longitudinal movement, means carried by the upper cross member to apply substantial longitudinal tension individually to each of the ribbons, said means comprising leaf springs, and means to hold the leaf springs flexed to cause them continuously to apply substantial tension to the ribbons.

5. A screen for separating undesired solids from a flowing liquid stream comprising, a generally rectangular frame including two side members and upper and lower cross members, which together with the side members define the outlines of the space through which the liquid may flow; a plurality of spaced parallel flat metallic ribbons secured to the lower cross member against upward longitudinal movement, said ribbons being spaced to divide the space between said frame members into rectangular screen openings of uniform width; resilient means above the upper cross member continuously to apply substantial longitudinal tension individually to each of the ribbons; and a shield covering the upper ends of the ribbons and the resilient means, said shield having slots through which the ribbons extend.

6. A screen comprising a rigid generally rectangular frame including upper and lower cross bars, the lower cross bar having a plurality of spaced slots therein extending transversely of the cross bar; a slotted shield secured to the upper cross bar and having slots therein in alignment with the slots in the lower cross bar; a plurality of flat metal screening ribbons having their lower ends extending through the slots in the lower cross bar and their upper ends extending through the slots in the shield; means at the lower ends of the ribbons to prevent upward movement of the ribbons and applying the holding forces at points adjacent the longitudinal axes of the ribbons; a plurality of leaf springs, one for each of the ribbons, fulcrumed above the upper cross bar, said leaf springs having slots in one end to receive the ribbons; means at the upper ends of the ribbon engaging the leaf spring near the longitudinal center line of the ribbon; and means maintaining the springs stressed so as continuously to apply an upwardly directed force to the ribbons thereby maintaining the ribbons under substantial tension.

7. A screen comprising a rigid generally rectangular frame including upper and lower cross bars, the lower cross bar having a plurality of spaced slots therein extending transversely of the cross bar, a slotted shield secured to the upper cross bar and having slots therein in alignment with the slots in the lower cross bar, a plurality of flat metal ribbons having their lower ends extending through the slots in the lower cross bar and their upper ends extending through the slots in the shield, means at the lower ends of the ribbons to prevent upward movement of the ribbons and applying the holding forces at points adjacent the longitudinal axes of the ribbons, a plurality of leaf springs one for each of the ribbons fulcrumed above the upper cross bar, said leaf springs having slots in one end to receive the ribbons, means at the upper ends of the ribbon engaging the leaf spring near the longitudinal center line of the ribbon, and means for maintaining the springs under stress so as continuously to apply sufficiently great upwardly directed forces to the ribbons to stress the ribbons to substantially one-half the allowable stress in tension of the metal of which the ribbons are composed.

8. A screen comprising a generally rectangular frame including two side frame members and upper and lower cross frame members which together define the space through which liquid may flow, a plurality of thin metal ribbons spaced from one another and extending in a direction parallel to the side members of the frame, said ribbons being spaced to divide the space between said frame members into rectangular screen openings of uniform width, cooperating means on one of the cross members and on the ends of the ribbons adjacent thereto to hold the ribbons against tensional forces applied thereto, and means adjacent the other cross bar adapted to cooperate with the other ends of the ribbons continuously to apply a substantial, uniform tensional force to each of the ribbons individually.

9. A screening member for installation in a frame structure having means for applying tension to the member comprising, a flat metal ribbon of width much greater than its thickness, and caps permanently secured to the ends of the ribbon, each of the caps having small bearing surfaces located on opposite surfaces of the ribbon in a plane passing through the longitudinal center line of the ribbon for cooperation with the tension applying means.

10. A screen comprising a frame having a pair of opposed end walls and a cross bar parallel to said end walls, said cross bar and said end walls each being provided with a plurality of transversely spaced slots in longitudinal alignment with each other, said slots extending downwardly from the upper edge of the end walls and cross bar and terminating short of the bottom, the slots in one of said end walls terminating in an enlarged recess, a plurality of screen members each having an enlarged end positioned in said enlarged recess, said screen members extending through the adjacent slots and the aligned slots in said cross bar, a plurality of complementary screen members each extending through a slot in said other end wall, means holding the ends of said complementary screen members adjacent said other end wall against longitudinal displacement, and means holding the opposite ends of the screen members under tension.

11. A screen comprising a frame having opposed end walls and a cross bar parallel to said end walls, a plurality of tranversely spaced recesses in one of said end walls, a slot extending longitudinally from each of said recesses to the inner edge of said one end wall, a plurality of slots extending longitudinally across said cross bar and said other end wall in alignment with said first mentioned slots, a flat metal ribbon disposed edgewise in each of said first mentioned slots, each of said ribbons having one end held in one of said recesses, the other ends of said ribbons terminating between said cross bar and said other end wall, another series of flat metal ribbons positioned in the slots in said other end wall, said second series of ribbons having one end abutting the outer side of said other end wall and its other end terminating in the space between said other end wall and said cross bar in spaced relationship to the second mentioned ends of said first series of ribbons, and a plurality of tension springs each having its opposite ends secured to the adjacent ends of said aligned ribbons to hold said ribbons under tension.

12. A screen for separating solids from a flowing liquid stream comprising, a generally rectangular frame including two side members and two cross members which define the outlines of the space through which the liquid may flow, a plurality of spaced parallel flat metallic ribbons each secured at one end to one of said cross members against longitudinal movement toward said other cross member, springs carried by said second cross member to apply longitudinal tension individually to each of said ribbons, means connecting the springs respectively to the other ends of the ribbons conformed to apply the resilient forces of the spring at points adjacent the longitudinal center lines of the ribbons.

13. A screen for separating solids from a flowing liquid stream comprising, a generally rectangular frame including two side members and two cross members which define the outlines of the space through which the liquid may flow, a plurality of spaced slots in the top of one cross member, said slots extending parallel to the side members of the frame, a plurality of thin metal ribbons each having one end thereof extending through one of said slots and having means at its extremity to prevent longitudinal movement towards said other cross member, a plurality of resilient means, one for each ribbon, mounted on said second cross member, each of said resilient means engaging the other end of one of said ribbons to hold it under constant tension.

14. A screen for separating solids from a flowing liquid stream comprising, a generally rectangular frame including two side members and two cross members which define the outlines of the space through which the liquid may flow, a plurality of spaced parallel flat metallic ribbons each secured at one end to one of said cross members against longitudinal movement toward said other cross member, said ribbons being spaced to divide the space between said frame members into rectangular screen openings of uniform width, and resilient means adjacent said other cross member to apply constant substantial longitudinal tension individually to each of the ribbons.

15. A screen comprising a rigid rectangular frame including upper and lower cross bars, the lower cross bar having a plurality of spaced slots therein extending transversely of said lower cross bar, a slotted shield secured to the upper cross bar and having slots therein in alignment with the slots in the lower cross bar, a plurality of flat metal screening ribbons having their lower ends extending through the slots in the lower cross bar and their upper ends extending through the slots in the shield, means at the lower ends of the ribbons to prevent upward movement of the ribbons and applying the holding forces at points adjacent the longitudinal axes of the ribbons, a plurality of resilient means, one for each of the ribbons, above the upper cross bar, and means at the upper end of each ribbon engaging one of said resilient means near the center line of the ribbon to apply an upwardly directed force to each of the ribbons to maintain the ribbons under substantial tension.

16. A screen comprising a frame having a pair of opposed end walls, a plurality of flat metal ribbons disposed edgewise and transversely spaced across said screen between said end members and means to maintain each of said ribbons under tension.

17. A screen comprising a frame having a pair of opposed end walls, a plurality of flat metal ribbons disposed edgewise and transversely spaced across said screen between said end members and yieldable means to maintain each of said ribbons under tension.

18. A screen comprising a plurality of flat metal ribbons disposed edgewise and means for holding said ribbons under tension in parallel transversely spaced relationship, each of said ribbons being yieldable in a transverse direction against the action of said holding means.

References Cited in the file of this patent

UNITED STATES PATENTS

| | | |
|---|---|---|
| 112,911 | Fair | Mar. 21, 1871 |
| 1,749,952 | Lichtman | Mar. 11, 1930 |
| 2,106,851 | Nordell | Feb. 1, 1938 |
| 2,118,957 | Wagner | May 31, 1938 |
| 2,205,758 | Clark | June 25, 1940 |

FOREIGN PATENTS

| | | |
|---|---|---|
| 30,328 | Great Britain | of 1909 |
| 630,041 | Germany | Nov. 27, 1934 |